(12) United States Patent
Mitsuhashi et al.

(10) Patent No.: US 12,309,461 B2
(45) Date of Patent: May 20, 2025

(54) INFORMATION COMMUNICATION TERMINAL DEVICE, AND DISPLAY CONTROL METHOD FOR SAID DEVICE

(71) Applicant: INFOCITY, Inc., Tokyo (JP)

(72) Inventors: Takamichi Mitsuhashi, Tokyo (JP); Toshihide Hayashi, Tokyo (JP); Gota Iwanami, Tokyo (JP)

(73) Assignee: INFOCITY, Inc., Tokyo (JP)

( * ) Notice: Subject to any disclaimer, the term of this patent is extended or adjusted under 35 U.S.C. 154(b) by 0 days.

(21) Appl. No.: 17/800,393

(22) PCT Filed: Feb. 12, 2021

(86) PCT No.: PCT/JP2021/005372
§ 371 (c)(1),
(2) Date: Aug. 17, 2022

(87) PCT Pub. No.: WO2021/166817
PCT Pub. Date: Aug. 26, 2021

(65) Prior Publication Data
US 2023/0125877 A1    Apr. 27, 2023

(30) Foreign Application Priority Data
Feb. 17, 2020 (JP) ................... 2020-024794

(51) Int. Cl.
*H04N 21/482* (2011.01)
*H04N 21/414* (2011.01)
(Continued)

(52) U.S. Cl.
CPC ... *H04N 21/4821* (2013.01); *H04N 21/41407* (2013.01); *H04N 21/4312* (2013.01); *H04N 21/64322* (2013.01)

(58) Field of Classification Search
CPC ......... H04N 21/41407; H04N 21/4312; H04N 21/4821; H04N 21/64322
See application file for complete search history.

(56) References Cited

U.S. PATENT DOCUMENTS

2003/0196201 A1* 10/2003 Schein ............... H04N 21/4182
348/564
2015/0208120 A1* 7/2015 Yao ................... H04N 21/64322
725/9
(Continued)

FOREIGN PATENT DOCUMENTS

JP      2011-049896 A       3/2011
JP      2017-126941 A       7/2017
JP      2017-188910 A       10/2017
WO      WO-2015181906 A1 *  12/2015  ........... H04N 21/436

OTHER PUBLICATIONS

International Search Report issued in PCT/JP2021/005372 on Apr. 27, 2021 (2 pages).
Written Opinion of the International Searching Authority issued in PCT/JP2021/005372 on Apr. 27, 2021 (3 pages).

*Primary Examiner* — Rong Le
(74) *Attorney, Agent, or Firm* — Osha Bergman Watanabe & Burton LLP

(57) ABSTRACT

An information communication terminal device adapted for an IPTV service, which delivers program data from one of a plurality of delivery servers via a communication network, includes: a program selection unit, a program data acquisition unit, and a display control unit. The program selection unit selects a program according to EPG information in which program scheduling is defined by a plurality of channels and a plurality of delivery time slots along a time axis, the program being selected based on the channels and the delivery time slots. The program data acquisition unit requests delivery of program data of the program to a specific delivery server according to link information and a program identification code, both of which are associated (Continued)

with the selected program, and acquires the program data delivered from the specific delivery server in response to the request. The display control unit performs control such that program content is displayed on a screen based on the received program data. The program selection unit identifies, in response to a user's input operation on the screen, a directional vector of the input operation, and selects, if the identified directional vector represents a first direction, the single program by identifying a channel of a switching destination in the same delivery time slot in the EPG information, the same delivery time slot corresponding to the first direction.

6 Claims, 13 Drawing Sheets

(51) Int. Cl.
*H04N 21/431* (2011.01)
*H04N 21/643* (2011.01)

(56) References Cited

U.S. PATENT DOCUMENTS

| 2017/0094360 A1* | 3/2017 | Keighran | H04N 21/4825 |
| 2018/0262806 A1* | 9/2018 | Greene | H04N 21/482 |
| 2018/0262812 A1* | 9/2018 | Chai | H04N 21/42224 |

* cited by examiner

Figure 5

| | Remote Control No. | 1 | 2 | 3 | 4 | 5 | 6 | 7 | 8 | 9 | 10 | 11 | 12 |
|---|---|---|---|---|---|---|---|---|---|---|---|---|---|
| HOKKAIDO | SAPPORO | BB BROADCASTING | AA E-TV | AA GENERAL | | CC BROADCASTING | DD BROADCASTING | TV EE | FF BROADCASTING | | | | |
| | | 19 | 13 | 15 | | 21 | 23 | 14 | 25 | | | | |
| | | http://.. | http://.. | .. | | http://.. | http://.. | http://.. | http://.. | | | | |
| | .. | .. | .. | .. | .. | .. | .. | .. | .. | .. | .. | | |
| TOKYO | Remote Control No. | 1 | 2 | 3 | 4 | 5 | 6 | 7 | 8 | 9 | 10 | 11 | 12 |
| | TOKYO SkyT | AA GENERAL | AA E-TV | | GG TV | TV HH | TV II | TV JJ | KK TV | TOKYO LL | | | BROADCASTING MM |
| | | 27 | 26 | | 25 | 24 | 22 | 23 | 21 | 16 | | | 28 |
| | | http://.. | http://.. | | http://.. | http://.. | http://.. | http://.. | http://.. | http://.. | | | http://.. |
| | .. | .. | .. | .. | .. | .. | .. | .. | .. | .. | .. | | |

*Figure 6*

| | 1ch AA GENERAL | 2ch E-TV | 4ch GG TV | 5ch TV HH | 6ch TV II | 7ch TV JJ | 8ch KK TV | 9ch TOKYO LL |
|---|---|---|---|---|---|---|---|---|
| 14 | 14:00 · · · · · | | 13:55 INFORMATION PROGRAM · · · | 14:00 · · · · · | 13:55 · · · · · | 13:50 · · · · · | 13:45 · · · · · | 14:00 · · · · · |
| 15 | 15:00 NEWS/ WEATHER FORECAST 15:10 · · | 15:00 · · · 15:30 · · · | | 14:56 · · · | 15:00 · · · | 15:00 · · · | 15:08 · · · | 15:05 · · · |
| 16 | 16:00 SUMO LIVE | | 16:00 · · · · · | 16:30 · · · | 16:00 · · · 16:30 · · · | | 16:58 · · · | 16:00 · · · |
| 17 | 17:00 SUMO LIVE | | 17:00 NEWS | 17:00 · · · | | 17:00 · · · | | 17:00 · · · |

INFORMATION COMMUNICATION TERMINAL DEVICE, AND DISPLAY CONTROL METHOD FOR SAID DEVICE

TECHNICAL FIELD

The present invention relates to information communication terminal devices and methods for controlling display on such devices, and in particular to an information communication terminal device that allows program content provided over communication networks to be viewed and a method for controlling display therein.

BACKGROUND ART

Conventionally, television broadcasting services have taken a hold in society, wherein viewers receive broadcasting of program content from broadcasting stations with terminal devices such as television receivers, set-top boxes, and smart phones with built-in reception tuners, and then view the program content. More recently, there has been increasing popularity of IPTV services (sometimes referred to as "Internet broadcasting services") which allow viewers to view, on terminal devices, program content that is streamed or delivered through communication networks, such as an IP network, from an Internet Service Provider (ISP) or Content Distribution Network (CDN) provider. An IP broadcasting service and an IP retransmission service are known as such IPTV services. An IP broadcasting service is a service based on a concept of channels in which programs are scheduled along a time axis, as with the conventional television services, and it allows program content on various channels to be viewed using communication networks. Also, an IP retransmission service can provide a service similar or equivalent to existing terrestrial digital broadcasting, BS digital broadcasting, CS digital broadcasting, and the like, using communication networks. Such an IPTV service allows the same services as terrestrial digital broadcasting and the like to be provided by connecting a viewing terminal device (with or without a tuner) to the Internet instead of an antenna, even in places where radio waves of terrestrial digital broadcasting and the like are difficult to receive.

In such IPTV services, video/voice data relating to program content and their related information are typically delivered to viewers using respectively different delivery schemes. More specifically, video/voice data is delivered under Real Time Streaming Protocol (RTSP) based on IP multicast technology, whereas information related thereto is often delivered under HTTP. For this reason, IPTV services require technology to display video/voice data and its related information, as program content, in a synchronized manner at a predetermined timing on a viewer's terminal device.

For example, Patent Document 1 discloses a reproduction technology that reproduces data, such as subtitles, that is transmitted separately from video content data in synchronization with the video content data, in a broadcasting retransmission service that retransmits conventional television broadcasting using a communication network.

Meanwhile, in digital terrestrial broadcasting, the viewable range (i.e., the broadcasting range or broadcasting region) is largely dependent on the distance over which the broadcast waves output from a radio tower can reach, and the broadcasting stations (channels) that can be selected are determined by the place of residence or current location of the viewer. Currently, viewers pre-register selectable broadcasting stations by entering and registering the setting, such as the postal code, address, etc., into the television receiver. Therefore, if a viewer uses a mobile terminal device such as a smartphone to receive an IP retransmission service correspondent to digital terrestrial broadcasting, such a terminal device needs to recognize a broadcasting station which covers a current location of the viewer in its broadcasting region.

Patent Document 2 discloses a technology that allows a user of a broadcasting receiver to select a desired IP-type broadcasting from among multiple IP-type broadcastings, while IP-type broadcastings output from the broadcasting receiver is limited to an IP-type broadcasting of a broadcasting station which covers a current location of the broadcasting receiver in its broadcasting range.

PRIOR ART DOCUMENTS

Patent Documents

Patent Document 1: Japanese Patent Publication No. 2017-188910
Patent Document 2: Japanese Patent Publication No. 2011-049896

SUMMARY OF THE INVENTION

Problems to be Solved by the Invention

In a quest to make the IPTV service become similar or equivalent to the digital terrestrial broadcasting service, etc., it is expected that viewing style of viewers (users) will shift from stationary-type television receivers up to now to mobile-type information communication terminal devices such as smartphones. At present, however, no user-friendly information communication terminal device that takes the IPTV service into consideration has been proposed.

In conventional digital terrestrial broadcasting, etc., users may cause an electronic program guide (EPG), in which programs are scheduled, to be displayed on a screen of a television receiver by means of an attached remote controller (commonly referred to as a "remote control") and may manipulate a directional button of the remote controller indicating vertical and horizontal directions in order to select and view a desired program (channel) (i.e., real-time viewing). In addition, with television receivers with a recording function, users may similarly manipulate the remote controller in order to select and view a desired program that is already recorded from a table with recorded programs, such as an EPG (i.e., time-shifted viewing).

However, mobile-type information communication terminal devices, such as smartphones, have a small screen size, which makes it inconvenient to have program tables such as EPGs displayed on the screen, because the characters are too small to be legible. In this case, the users may enlarge a particular area of the program table by performing, for example, a pinch-in or zoom-in operation on the screen to make the characters in the program table displayed on the screen legible. As a consequence, however, a scroll operation is needed to move the display area and manipulability is therefore not sufficient.

As such, an object of the present invention is to provide an information communication terminal device and a method for controlling display on such device, which bring about a new concept of screen display during program and/or channel selection or switching which is completely different from conventional television broadcasting.

More particularly, one of the objects of the present invention is to provide an information communication terminal device with a user interface that allows a user to easily switch from a currently viewed program to a program of another channel in the same delivery time slot (the delivery frame identified by time and date), and a method for controlling display in such device.

Further, one of the objects of the present invention is to provide an information communication terminal device with a user interface that allows a user to easily switch from a currently viewed program to a program in another delivery time slot on the same channel, and a method for controlling display in such device.

Further, one of the objects of the present invention is to provide an information communication terminal device and a method for controlling display on such device, which allow screen switching (transition) from a currently viewed program to a program of a switching destination to be performed in a smooth or continuous manner in association with a user input operation.

Means for Solving the Problems

The present invention for solving the above-described problems is configured to include the matters specifying the invention or technical features indicated below.

The present invention according to an aspect is an information communication terminal device adapted for an IPTV service which delivers program data from one of a plurality of delivery servers via a communication network. The information communication terminal device may comprise: a program selection unit which selects a program according to EPG information in which program scheduling is defined by a plurality of channels and a plurality of delivery time slots along a time axis, the program being selected based on the channels and the delivery time slots; a program data acquisition unit which requests delivery of program data of the single program to a specific delivery server according to link information and a program identification code, both of which are associated with the selected single program, and acquires the program data delivered from the specific delivery server in response to the request; and a display control unit which performs control such that program content is displayed on a screen based on the received program data. The program selection unit may identify, in response to a user's input operation on the screen, a directional vector of the input operation; and may select, if the identified directional vector represents a first direction, the single program by identifying a channel of a switching destination in the same delivery time slot in the EPG information, the same delivery time slot corresponding to the first direction.

Further, the program selection unit may select, if the identified directional vector represents a second direction orthogonal to the first direction, the program by identifying a delivery time slot of a switching destination on the same channel in the EPG information, the same channel corresponding to the second direction.

Further, while the program data acquisition unit acquires first program data relating to a first program that the user is currently viewing, the program data acquisition unit may start acquiring second program data relating to a second program of a switching destination during the user's input operation. The display control unit may then perform control such that first program content based on the first program data and second program content based on the second program data are displayed on the screen.

The user's input operation may include a first operation and a second operation following the first operation. For example, the user's input operation may be at least one of a swipe operation, a flick operation, or a scroll operation, with respect to the screen. The display control unit may display, in response to the first operation, a delivery time icon and a channel icon for the single program on the screen, and may identify, in response to the second operation, a directional vector.

Further, the display control unit may perform control such that switching from the first program content to the second program content is displayed in a smooth manner on the screen in response to the movements in the input operation.

Further, the display control unit may perform the switching from the first program content to the second program content on the screen by screen scrolling in the predetermined direction.

Moreover, the present invention according to an aspect may be a method for controlling display in an information communication terminal device adapted for an IPTV service that delivers program data from one of a plurality of delivery servers via a communication network. The method may comprise: acquiring EPG information in which program scheduling is defined by a plurality of channels and a plurality of delivery time slots along a time axis; selecting a program according to the acquired EPG information; requesting delivery of program data of the program to a specific delivery server according to link information and a program identification code associated with the selected program; in response to the request, acquiring the program data delivered from the specific delivery server; and performing control such that program content is displayed on a screen based on the acquired program data. The selecting of the program may comprise: identifying, in response to a user's input operation on the screen, a directional vector of the input operation; and selecting, if the identified directional vector represents a first direction, the program by identifying a channel of a switching destination in the same delivery time slot in the EPG information, the same delivery time slot corresponding to the first direction. In addition, the selecting of the program may comprise: selecting, if the identified directional vector represents a second direction orthogonal to the first direction, the single program by identifying a delivery time slot of a switching destination on the same channel in the EPG information, the same channel corresponding to the second direction.

Further, the present invention according to an aspect may be a computer program or a recording medium having such program stored thereon, for causing a computing device to perform the method for displaying program content based on program data delivered by one of a plurality of delivery servers via a communication network.

In the present disclosure, the term "means" does not merely mean a physical means but also encompasses the case where the functions of such means are achieved by software. In addition, a function of one means may be achieved by two or more physical means, and functions of two or more means may be achieved by one physical means.

Further, in the present disclosure, the term "system" includes an ensemble where multiple devices (or functional modules achieving specific functions) are logically assembled, regardless of whether each device or functional module is physically configured as a single entity or as a separate entity.

Effect of the Invention

The present invention can bring about screen display during channel selection or switching, which is a new concept completely different from conventional television broadcasting.

For example, the present invention allows a so-called "no display state" to be avoided by immediately displaying, on the screen, the program content of the switching destination channel when the channel being viewed by a user is selected or switched.

Other technical features, objects, effects, or benefits of the present invention will become apparent by the following embodiments described with reference to the attached drawings.

BRIEF DESCRIPTION OF THE DRAWINGS

FIG. 5 is a diagram showing an example of a channel allocation information in an IPTV service system according to an embodiment of the present invention.

FIG. 6 is a diagram showing an example of an EPG information in an IPTV service system according to an embodiment of the present invention.

DESCRIPTION OF THE EMBODIMENTS

Embodiments of the present invention will be described below with reference to the drawings. However, the embodiments described below are only illustrations, and there is no intention to exclude the application of various variations or technologies not expressly stated below. The present invention may be implemented with various variations (e.g., by combining each embodiment) without deviating from its spirit. In addition, the same or similar parts will be denoted with the same or similar references in the following description of the drawings. The drawings are schematic and do not necessarily correspond to the actual dimensions or ratios. Parts may also be included where the dimensional relationship or ratio between each other is different among the drawings.

Figure 1:
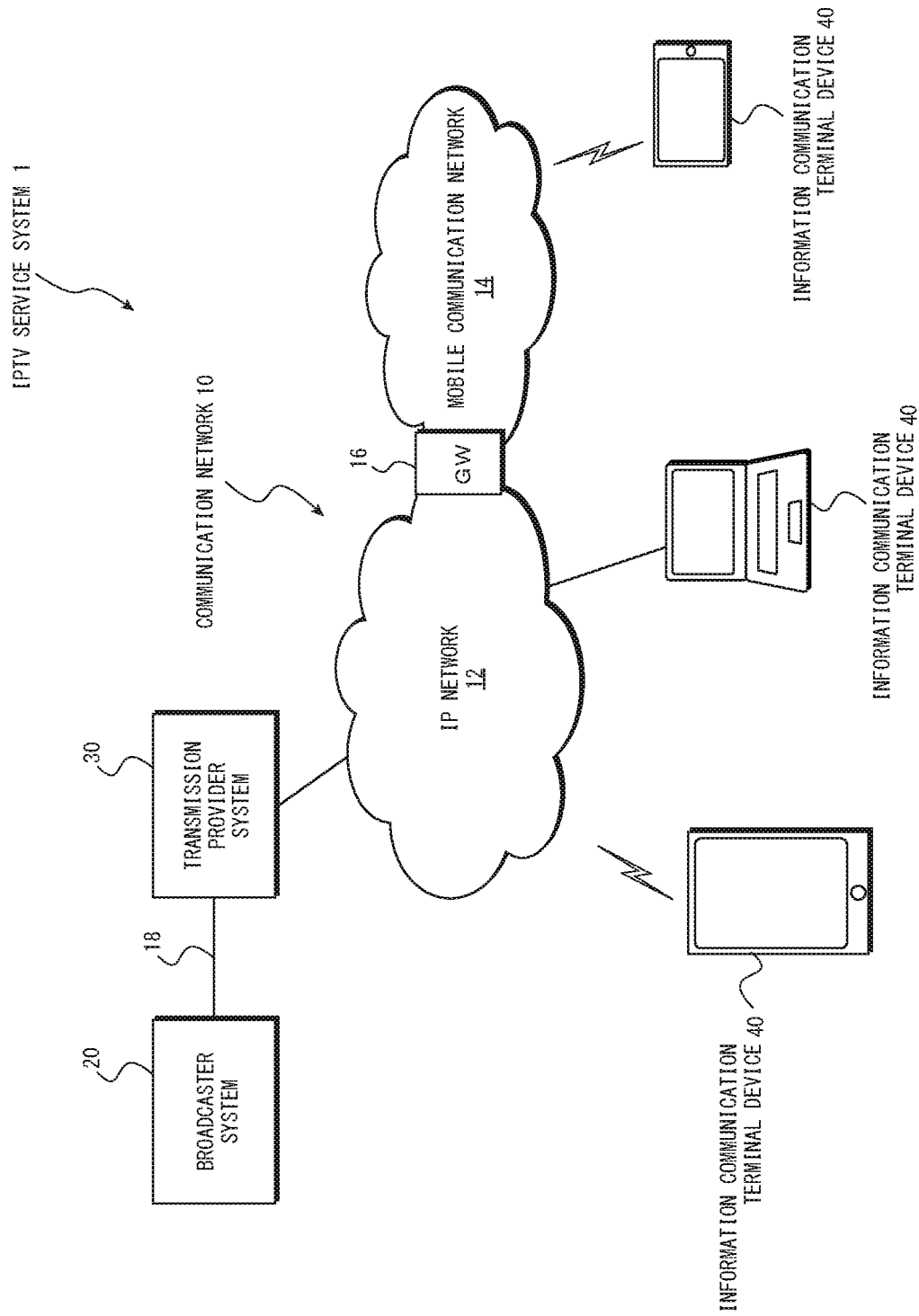
FIG. 1 is a schematic diagram for illustrating an IPTV service scheme according to an embodiment of the present invention.

FIG. 1 is a schematic diagram for illustrating the overall scheme of an IPTV service system according to an embodiment of the present invention. In the present disclosure, the IPTV service refers to a broadcasting service in which program content is streamed or delivered to a viewer (user) over an Internet Protocol (IP)-based network, and is distinguished from the conventional broadcasting service using broadcast waves (e.g., a digital terrestrial broadcasting service). The terms "send" and "deliver" may be synonymous, and they do not exclude words such as "transmit" or "transfer." The IPTV services known at the time of filing the present application include IP broadcasting and IP redelivery. In the present disclosure, the IPTV service system 1 is a system that achieves a broadcasting service in which program content from a broadcasting station is transmitted or delivered to a viewer via an IP-based network. The program content refers to a "program" that is scheduled along a time axis and that is viewed by the viewer, and may contain information related to the program, such as so-called subtitle data and/or data broadcasting data. Program content is configured from, for example, digital data packages or data streams such as videos, images, text and/or audio. For example, the data stream relating to the program content is configured in the "H.264/MPEG-4 AVC" format, which is a high-compression encoding technology. In this disclosure, the data stream relating to program content may also be referred to as "program data stream" or simply "program data."

As shown in the diagram, a communication network 10 may include the IP-based computer network 12 (hereinafter referred to as the "IP network"), a mobile communication network 14 compliant with mobile communication system standards, and the like. The communication network 10 may include a form of a Content Distribution Network (CDN). In the present disclosure, the communication network 10 is used in a broad concept including the Internet constructed by IP networks, but it is not limited to the IP networks and is not intended to exclude networks of other protocols that allow the delivery of program data. In addition, the communication network 10 may include wireless networks (e.g., Wi-Fi (registered trademark), etc.) constructed by wireless base stations or wireless access points that are not shown. The IP network 12 and the mobile communication network 14 are connected, for example, through a gateway 16, but this is not a limitation.

A broadcaster system 20 may be configured to include broadcasting facilities for performing television broadcasting and radio broadcasting. The broadcaster system 20 is managed and operated by, for example, a broadcaster who has been granted a broadcasting license (e.g., a broadcasting station), but this is not a limitation. Although not shown, the broadcaster system 20 will perform, for example, broadcasting services (e.g., digital terrestrial broadcasting) of program content stored on a sending server under control of the automatic operation system. More specifically, the broadcaster system 20 sends out program data according to the programs scheduled along the time axis. This program data may be emitted, for example, from a radio tower to a broadcasting-target region as broadcast waves. In addition, the program data may be transmitted to a delivery provider system 30 via, for example, a dedicated line 18.

The program content in the present disclosure may be the same as the program content for broadcasting provided by the conventional broadcasting service, or alternatively, it may be, for example, the program content for broadcasting added with more content. Alternatively, the program content may be different from the program content for broadcasting.

Figure 13:
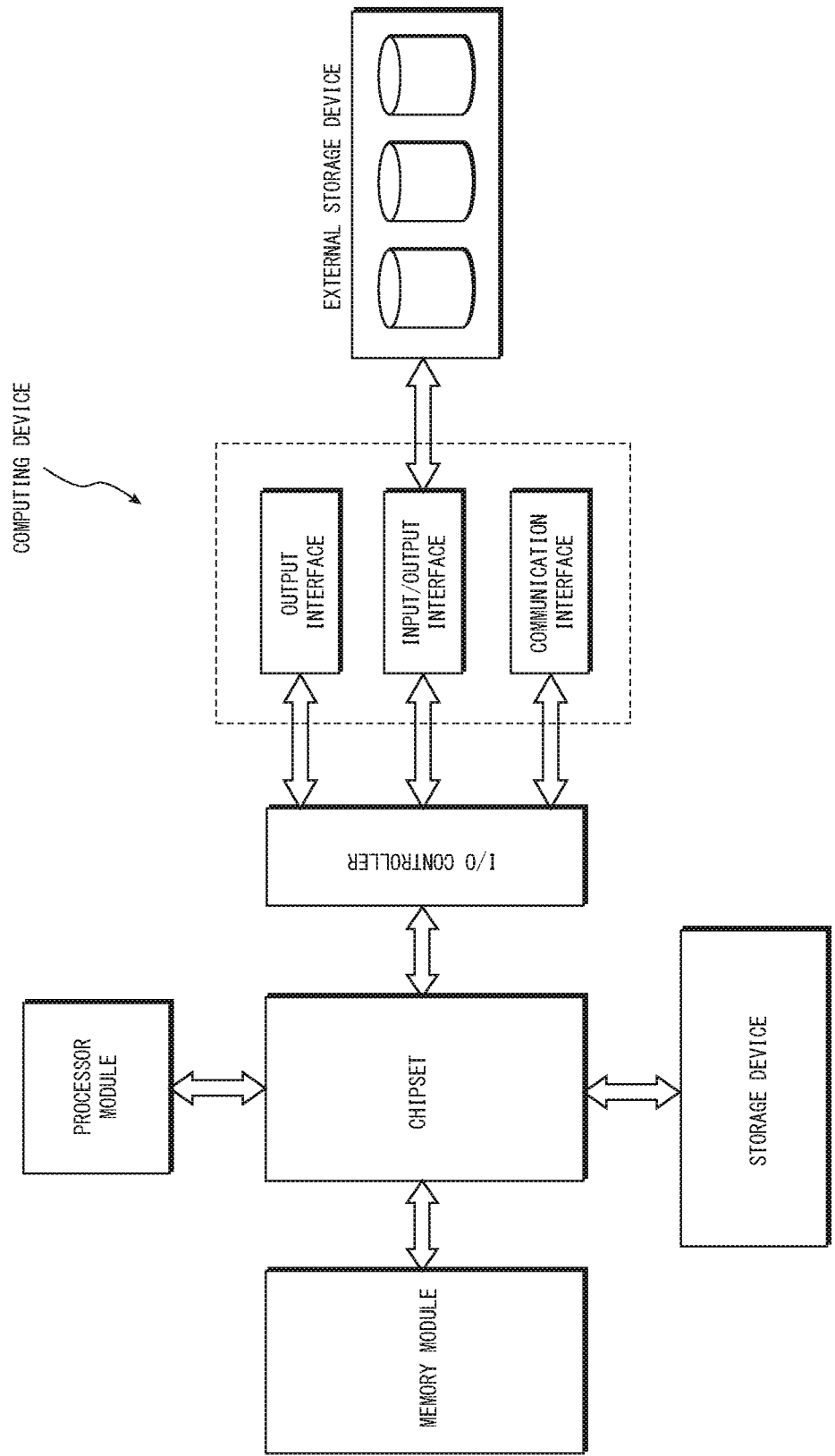
FIG. 13 is a diagram showing an example of a hardware configuration a delivery server in a delivery provider system according to an embodiment of the present invention.

The delivery provider system 30 may be configured to include a delivery server for distributing program data provided by broadcasters and production companies, etc., to viewers via the communication network 10. The hardware configuration of the delivery server is shown, for example, in FIG. 13, but the details of such configuration are omitted because it is already known. The delivery provider system 30 is managed and operated by, for example, a content delivery provider (CDN provider) and an Internet provider (ISP), but this is a limitation. Multiple delivery provider systems 30 may be placed, and one delivery provider system 30 may include multiple delivery servers. The program data is provided to the delivery provider system 30 via, for example, a dedicated line or broadcast waves emitted from a radio tower. In preparation for the delivery timing, the delivery provider system 30 may temporarily store the provided program data on the delivery server and may stream the program data according to the program scheduling using, for example, Real Time Streaming Protocol (RTSP) based on IP multicast technology to the viewer's information communication terminal device 40. The program data may be streamed to the information communication terminal device 40 using HTTP long polling or other transmission protocols. In addition, the delivery provider system 30 may deliver data relating to a portion of the program content (e.g., program-related information) and other information (e.g., EPG information or channel allocation information) to the viewer's information communication terminal device 40. Typically, the delivery provider system 30 scrambles and delivers various types of data, including program data, etc.

In the present disclosure, the delivery server may store program data on a storage device for a certain period of time (e.g., one day, one week, two weeks, or one month or more) so as to allow programs to be provided to viewers who missed the programs that have been delivered under real-time delivery time slots (simultaneous or synchronization with broadcasting). The delivery server may respond to a request for delivery of program data sent from the viewer's information communication terminal device 40 and deliver the program data under a time slot different from that of the one being viewed.

In the present disclosure, the broadcaster system 20 and the delivery provider system 30 are configured as separate systems; however, the present disclosure is not limited thereto and the broadcaster system 20 may be configured to include the functions of the delivery provider system 30, and vice versa. Further, the delivery provider system 30 may be managed and operated by the broadcaster.

The information communication terminal device 40 is a computing device operated by a user who is a viewer viewing the program, and examples of which include a desktop computer, a laptop computer, a tablet computer, a smartphone, a feature phone, and other intelligent devices, but the device is not limited thereto. In the present example, the information communication terminal device 40 is a smartphone that allows for interactive operations via a touch panel or touch screen, and is configured as a viewing terminal device adapted for the program content viewing in the IPTV service, as described below.

More specifically, the information communication terminal device 40 is configured from hardware resources, such as a CPU (processor), a chipset, memory, a communication module, and a user interface, and software resources such as an operating system (which may be configured to include, for example, a kernel, various device drivers, standard libraries, etc.) (hereinafter referred to as the "OS"). The information communication terminal device 40 executes various application programs on the OS under the control of the processor, and achieves desired functions. In the present disclosure, the information communication terminal device 40 may be implemented with, for example, an IPTV viewing program, as one of the application programs, that includes modules or a group of instructions for making the information communication terminal device 40 function as a viewer (a so-called viewing terminal device) by means of which programs in the IPTV service can be viewed. Alternatively, the information communication terminal device 40 may be implemented with a browser program, as one of the application programs, and may be configured to achieve the above-described function by way of an add-on program of the browser implemented by the browser program.

The information communication terminal device 40 implemented with the IPTV viewing program receives video/audio data (i.e., program data) relating to the main program content streamed from the delivery provider system 30 according to, for example, the RTSP, and displays the video of the program based on the received program data in real time in a predetermined display area of the screen serving as the user interface and outputs the audio (voice, music, sound effects, etc.) that is synchronized with the video based on the program data. The information communication terminal device 40 displays sub-program content delivered by the delivery provider system 30 according to, for example, the HTTP long polling, either superimposed on the main program content or in a display area separate from the display area for the main program content. The sub-program content may be linked content (complementary or related content) of the main program content, or non-linked content (independent content).

Moreover, the information communication terminal device 40 of the present embodiment sends a request to the delivery provider system 30 to deliver channel allocation information, and retrieves predetermined channel allocation information delivered in response to the request and stores this in a predetermined storage area. The channel allocation information may also be delivered according to, for example, the HTTP long polling, but this is not a limitation. For example, in response to a user operation, the information communication terminal device 40 displays a channel icon or object superimposed on the screen according to the stored channel allocation information.

Moreover, the information communication terminal device 40 sends, according to the channel allocation information, a request for delivery of EPG information to a specific delivery provider system 30 and acquires predetermined EPG information delivered in response to the request, and stores this in a predetermined storage area. The EPG information is configured to include information on program scheduling for each broadcaster along the time axis. The EPG information may also be delivered according to, for example, the HTTP long polling, but this is not a limitation. In the present disclosure, the information communication terminal device 40 stores EPG information including information on program scheduling for a certain period of time in the past (e.g., for the past 24 hours, 48 hours, one week, etc.), in addition to information on programs that are scheduled to be delivered. For example, the information communication terminal device 40 discards program scheduling information for which a certain amount of time has passed and additionally holds program scheduling information based on newly-acquired EPG information. By way of this, the information communication terminal device 40 may hold EPG information, including program scheduling information for a period of time in the past and for a certain period of time into the future that is scheduled to be delivered, referencing the current time.

It should be noted that the information communication terminal device 40 may be a mobile terminal device such as a smartphone as in the present example, but it may also be a computing device in which an input operation can be performed by a pointing device such as a mouse or touch pad, instead of a touch panel.

In the IPTV service system 1 as described above, the user who is viewing a program from a delivery time slot of a channel on a screen of the information communication terminal device 40 may perform a program switching operation via the user interface. The program switching operation includes switching to a different delivery time slot on the same channel and switching to a different channel in the same delivery time slot. Upon receiving the program switching operation by the user via the user interface, the information communication device 40 identifies a program of the switching destination according to the held EPG information and sends a request for delivery of program data regarding the program to the delivery provider system 30, and thereby starts receiving the program data of the switching destination. In this case, the information communication terminal device 40 may receive the program data of the switching destination and the program data of the program currently being viewed in parallel. This parallel reception allows the information communication terminal device 40 to smoothly switch (transition) the screen display.

Although not shown in FIG. 1, the IPTV service system 1 may include an authentication server for authenticating the user (viewer) and/or the information communication terminal device 40 when providing the IPTV services.

Figure 2:
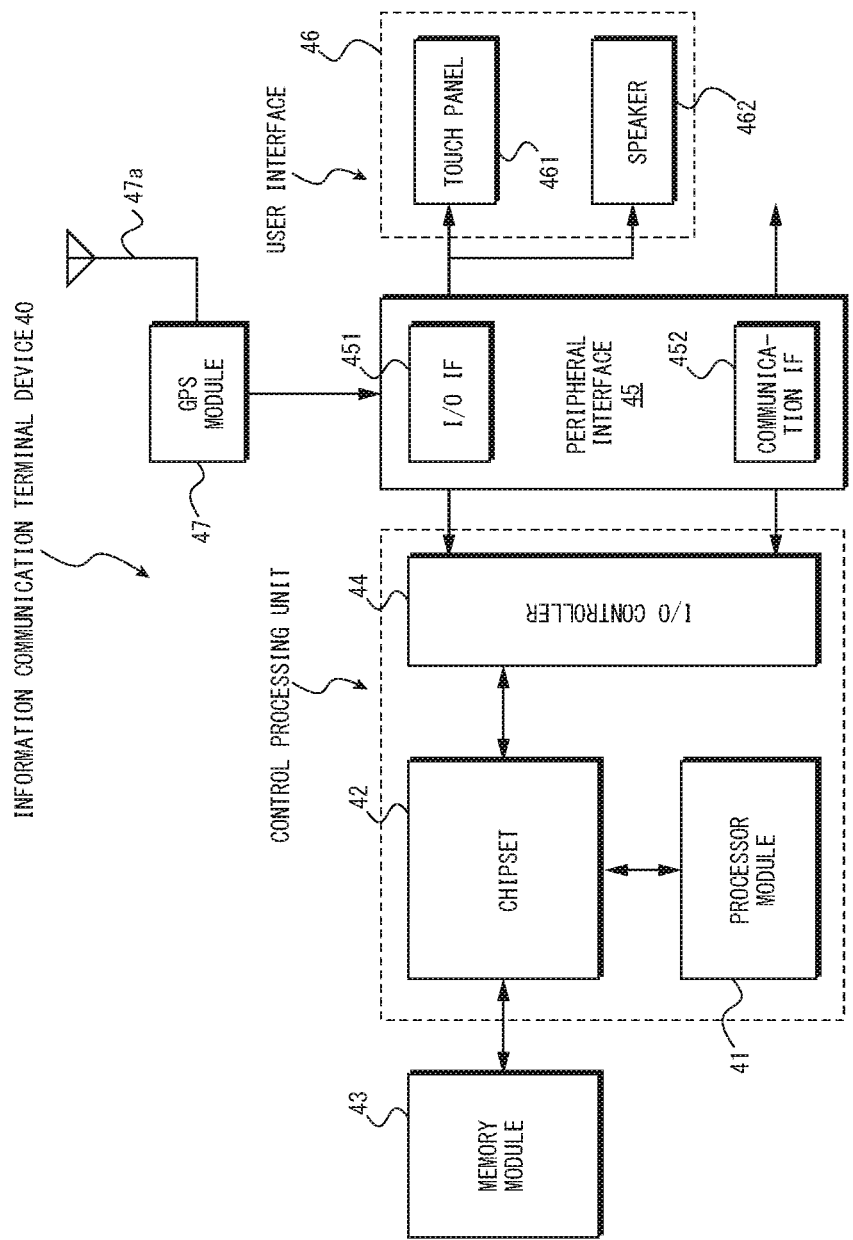
FIG. 2 is a diagram showing an example of a hardware configuration an information communication terminal device adapted for an IPTV service system according to an embodiment of the present invention.

FIG. 2 is a diagram showing an example of a hardware configuration an information communication terminal device adapted for the IPTV service system according to an embodiment of the present invention. The diagram shows those hardware resources that are of particular relevance to the present disclosure from among various hardware resources configuring the information communication terminal device 40.

More specifically, as shown in FIG. 2, the information communication terminal device 40 may typically be configured to include one or more processor modules 41, a chipset 42, a memory module 43, an I/O controller 44, various peripheral interfaces 45, and various input/output devices 46. In this example, the information communication terminal device 40 further includes a GPS module 47. Although not shown, the information communication terminal device 40 may include a calling unit that achieves a calling function. For example, the information communication terminal device 40 may accept voice input from the user via the calling unit.

The processor module 41 includes, for example, a processor (processor core), a microcontroller, a digital signal processor, and/or a combination thereof, but the processor module is not limited thereto. The chipset 42 consists of a circuit on which bridges for the buses connecting the processor module(s) 41, the memory module 43, and the I/O controller 44, etc. and other components necessary for configuring the information communication terminal device 40 are integrated. The chipset 42 is controlled by, for example, the processor module(s) 41.

Figure 3:
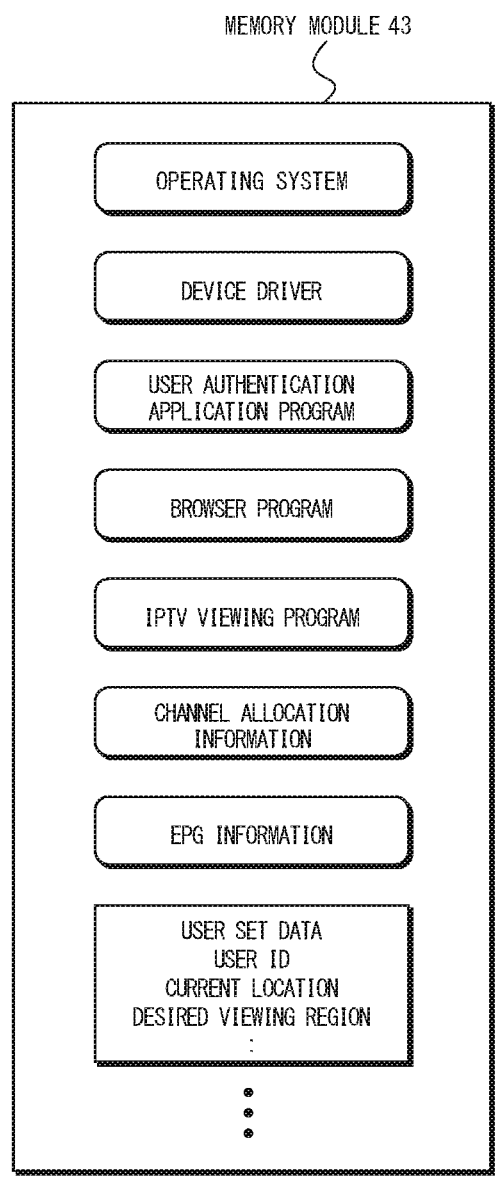
FIG. 3 is a conceptual diagram for illustrating an example of a stored content a memory module of an information communication terminal device according to an embodiment of the present invention.

The memory module 43 is typically a primary storage device consisting of volatile memory (e.g., RAM), non-volatile memory (e.g., ROM, flash memory), and/or a combination thereof. As shown in FIG. 3, the memory module 43 typically holds all or part of the device drivers, operating system (OS) programs, one or more application programs, data, or the like, and is made available for use by the processor module(s) 41. In the present embodiment, the application programs include the IPTV viewing program that is executed on the information communication terminal 40. The data includes, for example, channel allocation information, the names of the setup regions, and EPG information. The IPTV viewing program may be pre-stored in the memory module 43 at the time of shipment of the information communication terminal device 40, or may be stored in the memory module 43 by being downloaded from a predetermined server computer on the communication network 10 using a communication interface 452. The IPTV viewing program of the present disclosure is configured to include a function for, in response to a user input operation via the user interface, identifying a program of the switching destination according to the EPG information and for acquiring program data of the identified program. The IPTV viewing program is also configured to include a function for performing transition from screen display of the currently viewed program to screen display of the program of the switching destination, while receiving the program data of the currently viewed program and the program data of the program of the switching destination in parallel.

The I/O controller 44 is a circuit for controlling communication between various peripheral interfaces 45 (e.g., an I/O interface 451 and a communication interface 452). The I/O interface 451 controls, for example, the operation of external input/output devices such as a touch panel 461 and speaker 462, which configure the user interface. The I/O interface 451 may also include, for example, a serial controller or parallel controller, and may control the operation of external storage devices, other peripheral devices, and the like. The communication interface 452 is a circuit that allows for computer communication via the IP network 12. In the present disclosure, the communication interface 452 is primarily used for communication (e.g., streaming) with the delivery provider system 30 via the IP network 12.

The touch panel 461 is configured to include a display for displaying program content composed of videos, text, and images, and a transparent touch sensor sized to approximately match the size of the display. The touch panel 461 is an example of a device that achieves the user interface. Under control of the processor module(s) 41, the touch panel 461 displays various screens on the display and accepts interactive operations from the user. In the present disclosure, the touch panel 461 provides, under control of the processor module(s) 41, the user with screens relating to the program content and accepts interactive operations by the user, such as a touch operation and/or a swipe operation. Operation performed on the touch panel 461 may be performed by the user's finger, or by a stylus pen, or the like. In addition, operation buttons (not shown) may be provided to replace or complement the user operation with the touch panel 461. A normal display and a pointing device, such as a mouse, may be employed instead of the touch panel 461.

The speaker 462 outputs audio or sound based on audio signals generated by a sound processor (not shown). Under control of the processor module(s) 41, the speaker 462 outputs, for example, voice, music, sound effects, and the like synchronized with the videos in the received program content.

The GPS module 47 is a circuit for demodulating GPS signals received at a GPS antenna 471 into baseband signals. The information communication terminal device 40 may acquire location information by processing the digital signals corresponding to the GPS signals by the processor module(s) 41. The acquired location information is used, for example, for identifying the broadcasting region that covers a current location of the user.

Figure 4:
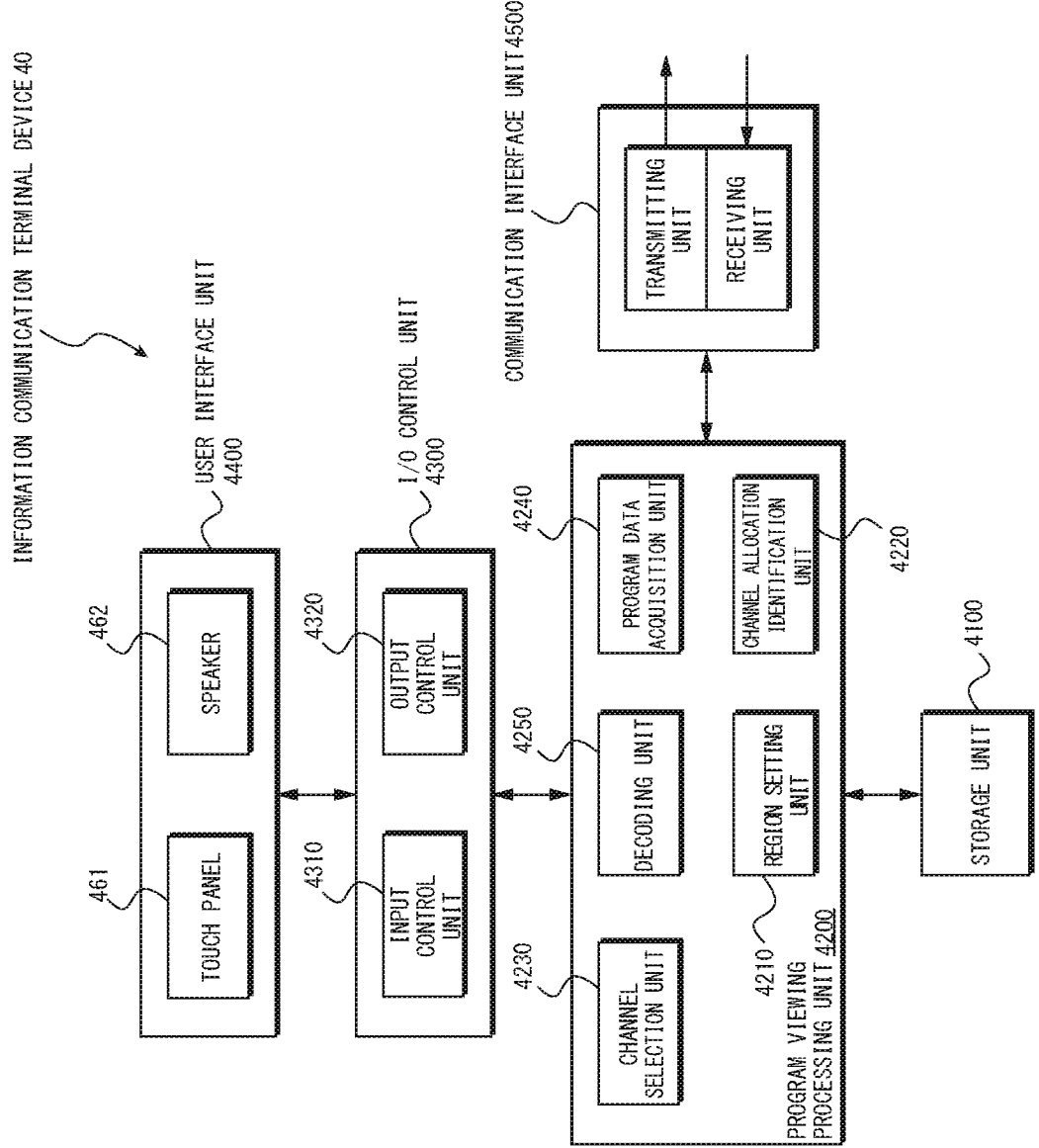
FIG. 4 is a diagram illustrating an example of a functional configuration an information communication terminal device adapted for an IPTV service system according to an embodiment of the present invention.

FIG. 4 is a diagram illustrating an example of a functional configuration the information communication terminal device adapted for the IPTV service system according to an embodiment of the present invention. The diagram shows those components that are of particular relevance to the present disclosure from among various components configuring the information communication terminal device 40. Such components may be achieved by the hardware resources described above or by any part thereof, or alternatively, for example, by the processor of the information communication terminal device 40 executing the application programs on the OS in cooperation with various hardware resources.

As shown in the diagram, the information communication terminal device 40 of the present embodiment is configured to include a storage unit 4100, a program viewing processing unit 4200, an I/O control unit 4300, a user interface unit 4400, and a communication interface unit 4500.

The storage unit 4100 stores the channel allocation information and also, in accordance with the channel allocation information, stores one or more region names for identifying each broadcasting region where the user wishes to perform viewing. FIG. 5 is a diagram showing an example of a channel allocation information in the IP service system according to an embodiment of the present invention. The channel allocation information is a table that defines channel allocations of broadcasting regions that are partitioned by the range reachable by the broadcast waves. The channel allocation information of the present embodiment includes network location information (e.g., URLs) of the delivery servers of the delivery provider systems 30 corresponding to the respective broadcasting regions. The channel allocation information is acquired, for example, from server computers of the broadcaster systems 20 and/or the delivery provider systems 30. For example, in the case of terrestrial digital broadcasting, the region names are the names of the broadcasting regions, such as "Sapporo," "Tokyo" (e.g., the region based on Tokyo Sky Tree), or "Kagoshima." The region name is set, for example, by a region setting unit 4210 via a user interactive operation, and is held in the storage unit 4100.

Further, the storage unit 4100 stores EPG information delivered from the delivery servers. FIG. 6 is a diagram showing an example of EPG information in the IPTV service system according to an embodiment of the present invention. The EPG information is configured to include information on program scheduling for each broadcaster along the time axis. Each program is identified by a channel corresponding to a broadcasting region and a delivery time slot along the time axis (a delivery frame identified by the time information). The channel corresponds to the channel allocation of the broadcasting regions. In the present disclosure, the EPG information includes program scheduling information on the programs scheduled to be delivered in the future and program scheduling information of a certain period of time on the programs that were delivered in the past. The EPG information is updated as the latest EPG information is acquired. Although not shown in this diagram, each program is allocated with an identification code (hereinafter referred to as the "program identification code") for uniquely identifying the program. The program identification code itself may be configured to include information for uniquely identifying the channel (broadcaster).

In addition, the storage unit 4100 may provide a cache function for temporarily storing the program data acquired by a program data acquisition unit 4240.

Returning to FIG. 4, the program viewing processing unit 4200 performs, under the control of the processor, the processing for allowing the program content by the IPTV service to be viewed. For example, the program viewing processing unit 4200 is configured to include the region setting unit 4210, a channel allocation identification unit 4220, a program selection unit 4230, the program data acquisition unit 4240, and a decoding unit 4250.

Under the user's interactive operations, the region setting unit 4210 sets the selected region name stored in the storage unit 4100 as the viewing-target broadcasting region (i.e., the broadcasting region where the user has performed viewing). The region name is selected from among several region names defined in the channel allocation information. For example, the region setting unit 4210 displays a list of broadcasting regions (region names) on the touch panel 461 in response to a user's input operation and prompts the user to select a region name. Alternatively, the region setting unit 4210 may set a region name defined in the channel allocation information based on the location information acquired from the GPS module 47 under a user operation. The list of broadcasting regions (region names) may be configured hierarchically, such as, "Kanto"→"Tokyo"→"Tokyo SkyT." The region setting unit 4210 writes the region name selected by the user into the storage unit 4100.

The channel allocation identification unit 4220 identifies the channel allocation corresponding to the set broadcasting region. The channel allocation identification unit 4220 may identify the appropriate channel allocation from, for example, the channel allocation information. This allows the information communication terminal device 40 to let the user select one of the channels available for viewing in the set broadcasting region according to the identified channel allocation.

The program selection unit 4230 selects a program of an arbitrary delivery time slot on an arbitrary channel in the set broadcasting region according to the held EPG information under the user's interactive operation. As one example, when an input operation (e.g., a swipe operation, a flick operation, or a scroll operation) performed by the user on the touch panel 461 is accepted while the user is viewing a program, the program selection unit 4230 identifies a program depending on the direction of finger movement according to the held EPG information and passes the channel and/or program identification code of the program to the program data acquisition unit 4240. The program selection unit 4230 associates the selected program with a reference position (delivery frame) that is identified by the channel and delivery time slot in the EPG information. In other words, the program selection unit 4230 identifies a program corresponding to the current reference position in the EPG information by updating the channel and/or the delivery time slot in response to the user's operation.

Figure 7:
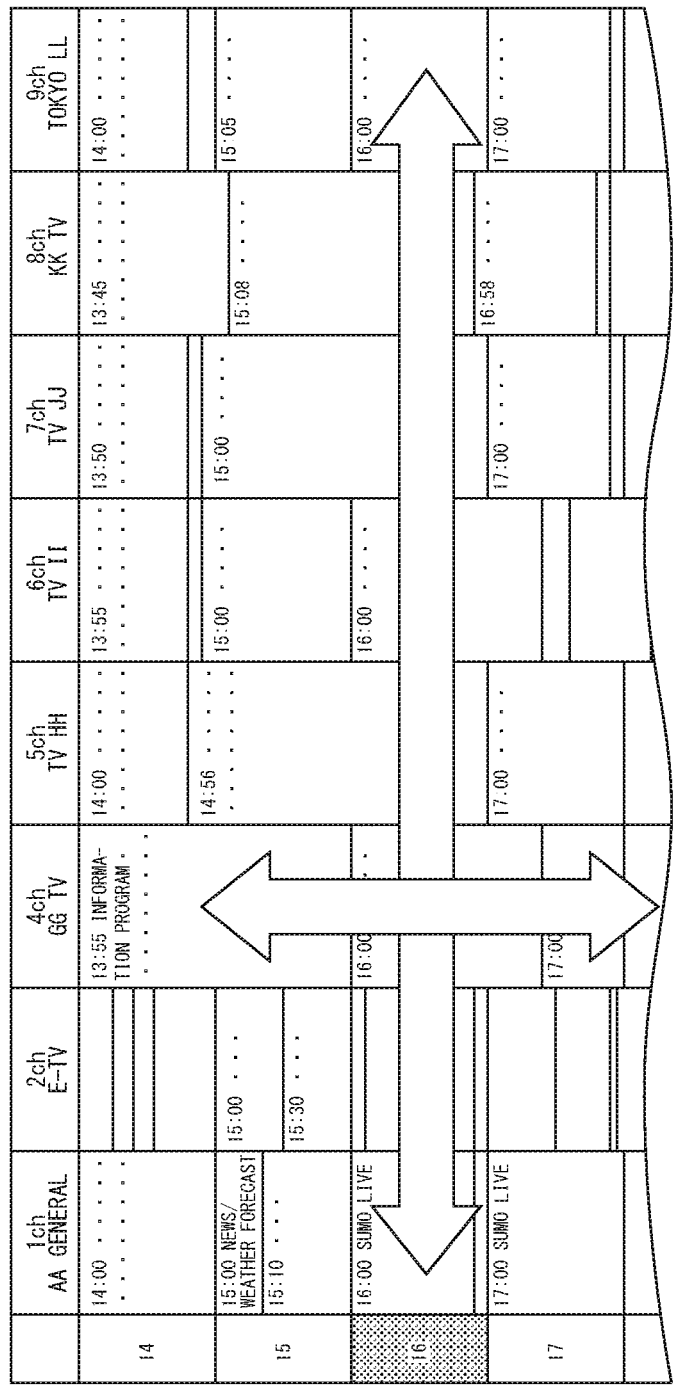
FIG. 7 is a diagram showing an example of an EPG information in an IPTV service system according to an embodiment of the present invention.

For example, as shown in FIG. 7, a user viewing a program in the delivery time slot "16:00" on channel number "4" may select a program on a different channel number in the same delivery time slot by swiping in a first direction (e.g., horizontally) on the screen of the touch panel 416 (e.g., a swipe from right to left selects a program on channel number "5" in the delivery time slot "16:00"). Alternatively, the user may select a program in a different delivery time slot on the same channel by swiping in a second direction (e.g., vertically) orthogonal to the first direction (e.g., a swipe from top to bottom selects a program in the delivery time slot "15:00" on channel number "4"). The reference position in the EPG information is updated depending on the direction of the swipe operation. Therefore, the user may select any program in the EPG information by, for example, combination of a horizontal swipe operation and a vertical swipe operation.

The program data acquisition unit 4240 identifies, according to the channel allocation information, the URL associated with the channel of the program selected by program selection unit 4230. The program data acquisition unit 4240 then sends a request for delivery of program data corresponding to the selected program via the communication interface unit 4500, based on the identified URL and the program identification code. In response to this, the delivery provider system 30 starts streaming program data according to the RTSP.

The program data acquisition unit 4240 acquires, via the communication interface unit 4500, the program data streamed from the delivery provider system 30 in response to the request for delivery of the program data. The program data acquisition unit 4240 passes the program data to the decoding unit 4250 so that program content based on the acquired program data can be displayed on the screen.

Further, if a program switching operation is detected while receiving the program data (first program data) of the program currently viewed, the program data acquisition unit 4240 may acquire or pre-fetch, in parallel with the acquisition of the first program data, the program data (second program data) of the program of the switching destination. Such simultaneous parallel program data acquisition by the program data acquisition unit 4240 may be performed, for example, until the switching of screen display of the program is complete. It should be noted that the amount of program data received simultaneously in parallel may be set to be limited, for example, depending on a communication bandwidth and the processing performance of the processor. In the present disclosure, the configuration of the program data acquisition unit 4240 or of the program data acquisition unit 4240 and the communication interface unit 4500 is an aspect of a program data acquisition means.

The decoding unit 4250 decodes the program data, thereby video data for displaying the video relating to the program content on the touch panel 461 and audio data synchronized with the video are generated. If multiple stream of program data are received in parallel, the decoding unit 4250 decodes each stream of program data and generates video data thereof. If the program data delivered from the delivery provider system 30 is scrambled, the decoding unit 4250 descrambles such program data. The generated video data and audio data are output to the user interface unit 4400 via the I/O control unit 4300.

The I/O control unit 4300 is configured to include, for example, an input control unit 4310 and an output control unit 4320. The input control unit 4310 calculates coordinates of the touched position in the screen based on the operation signals detected by the touch sensors of the touch panel 461, and enters them into the program viewing processing unit 4200. For example, an input processing unit (not shown) interprets the user's input operation from the position coordinates in the screen, and thereby the program viewing processing unit 4200 performs processing in response to the input operation. As described above, the program selection unit 4230 identifies a program in the EPG information according to the direction in which the user's finger moves. The output control unit 4320 controls the display of the touch panel 461 such that the video of the program content based on the video data output from the decoding unit 4250 is displayed and it also controls the speaker 462 such that audio synchronized with the video is output.

The user interface unit 4400 is configured to include, for example, the touch panel 461 and the speaker 462, and provides the user with a user interface. As described above, the user interface unit 4400 provides the user with a screen that displays various videos, images, text, etc. on the touch panel 461, and detects the user's interactive operation with the touch sensor and accepts the same. An example of user input operations may include the first operation and the second operation following the first operation. The first operation may be, for example, the first touch or tap operation on the screen. The second operation may be an operation that involves, for example, movement in a predetermined direction within the screen (e.g., a swipe operation, a flick operation, or a scroll operation). For example, a single swipe operation may be considered as an operation including a first operation, which is a touch operation to the screen, and a second operation, which is a movement operation within the screen. The first operation and the second operation that follows the first operation should be considered as a series of operations. For example, if the screen is tapped as the first operation and then a movement operation is performed as the second operation (following a second tough operation) within a predetermined amount of time after the finger has been removed, then they are considered as a series of operations.

The communication interface unit 4500 is configured to include, for example, a transmitting unit 4510 and a receiving unit 4520. The transmitting unit 4510 sends out, for example, a request for delivery of the program data made by the program data acquisition unit 4240 onto the communication network 10 by converting the request into a predetermined communication data format. The receiving unit 4520 receives data addressed to itself on the communication network 10, converts the format of the data, and passes the converted data to the program viewing processing unit 4200.

Figure 8:
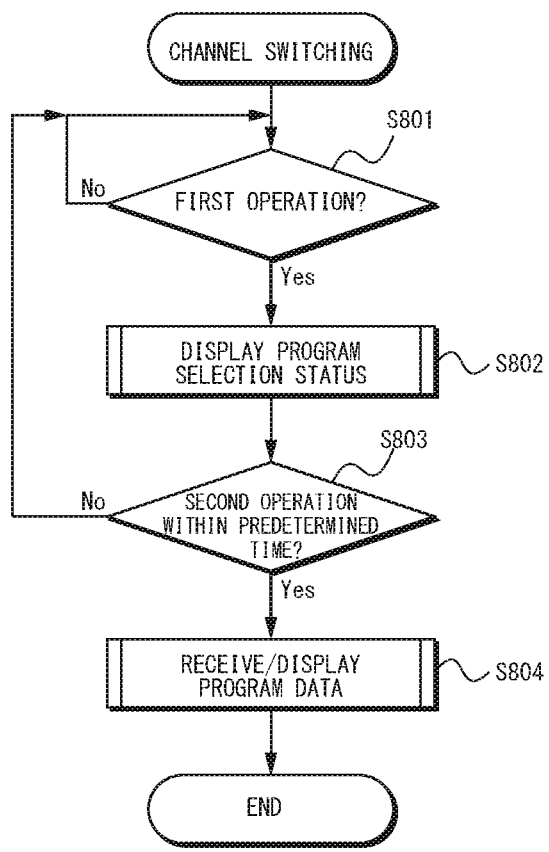
FIG. 8 is a flowchart for illustrating program switching processing in the information communication terminal device according to an embodiment of the present invention.

FIG. 8 is a flowchart for illustrating program switching processing in the information communication terminal device according to an embodiment of the present invention. Such processing may be achieved, for example, by the information communication terminal device 40 executing the IPTV viewing program, under control of the processor, in cooperation with various hardware resources.

As shown in FIG. 8, in a state where a program switching operation by the user may be accepted e.g., while the program content is displayed on the screen), the program viewing processing unit 4200 of the information communication terminal device 40 monitors whether an operation (the first operation) serving as a trigger for a program switching operation has occurred (S801). In this example, the program switching operation is assumed to be a swipe operation on the screen of the user interface unit 4400. For example, in a state where the program content corresponding to the currently-selected delivery time slot and channel is displayed on the screen of the user interface unit 4400, the user touches the screen for switching the program. When the user interface unit 4400 detects such touch operation by the user, the user interface unit 4400 notifies this to the program viewing processing unit 4200 via the I/O control unit 4300. Thereby, the program viewing processing unit 4200 becomes aware that the first operation has occurred.

Figure 9:
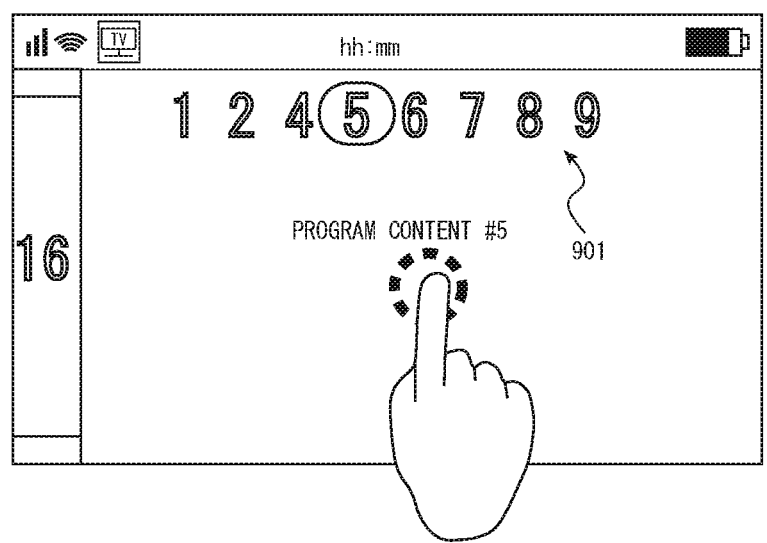
FIG. 9 is a diagram showing an example of a screen displayed on a user interface of an information communication terminal device according to an embodiment of the present invention.

If the program viewing processing unit 4200 determines that the first operation by the user has occurred (S801, Yes), the program viewing processing unit 4200 displays the delivery time slot and the channel number of the currently selected program on the screen to inform the user of the current program selection (S802). For example, in response to the user's touch operation, the program viewing processing unit 4200 displays a time slot icon on the left side of the screen and a channel icon on the upper side of the screen such that the icons are displayed superimposed on the program content displayed on the screen as shown in FIG. 9. FIG. 9 shows that the program content the user is viewing is a program at 16:00 on channel number "5."

The program viewing processing unit 4200 then determines whether a second operation has occurred within a predetermined time period (S803). The second operation herein is an operation (movement operation) that involves movement in a predetermined direction on the screen following a touch operation. If the program viewing processing unit 4200 determines that no second operation has occurred within the predetermined time period (S803, No), the program viewing processing unit 4200 returns to the processing in S801. For example, if the user does not perform any operation for a certain time period (e.g., one second or more) after the user touched the screen, the program viewing processing unit 4200 determines that the program switching operation has been canceled and returns to monitoring the first operation.

On the other hand, if the program viewing processing unit 4200 determines that the second operation has occurred within the predetermined time period (S803, Yes), the program viewing processing unit 4200 starts receiving and display processing the program data as described below (S804) as it continues the program switching processing.

Figure 10:
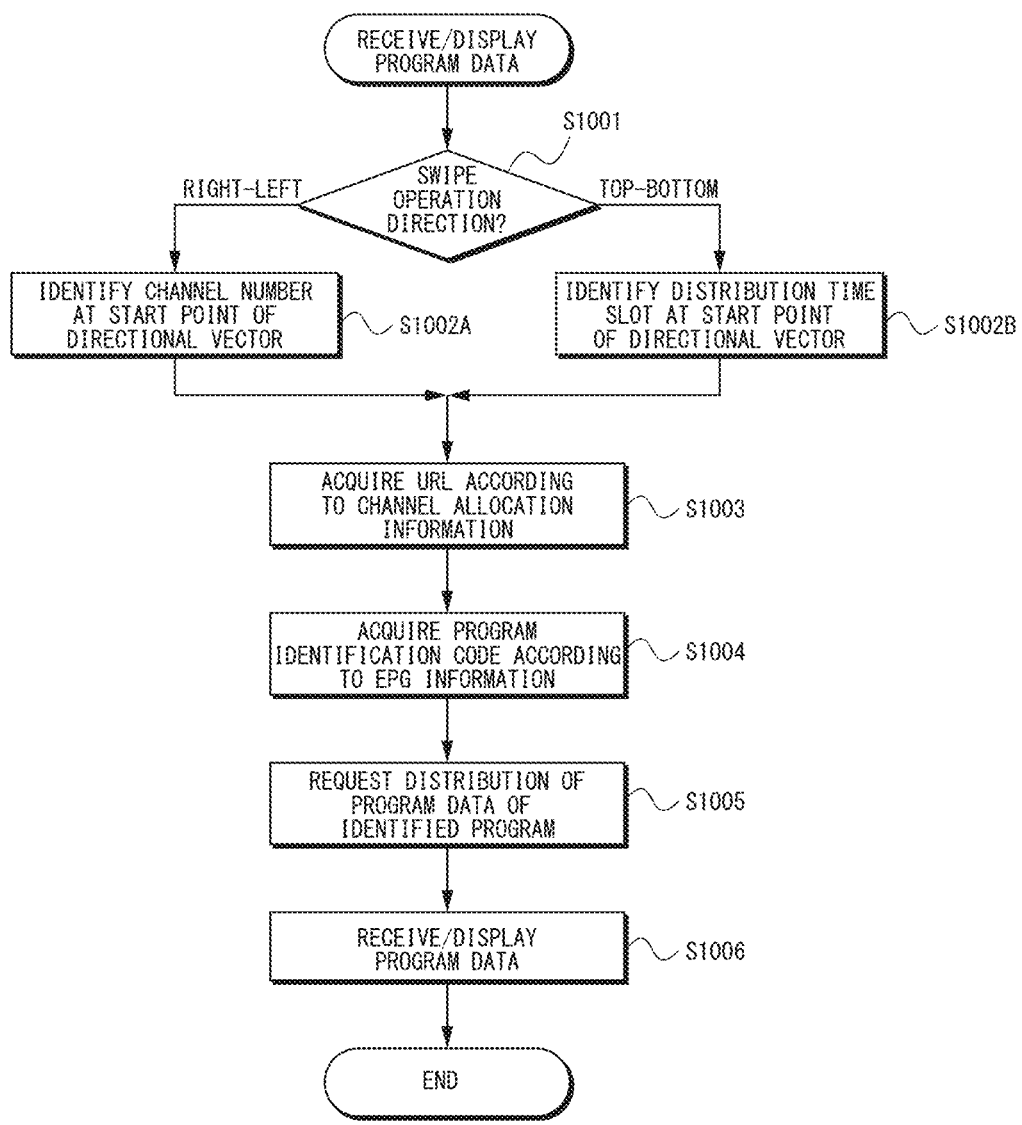
FIG. 10 is a flowchart for illustrating program data reception/display processing in an information communication terminal device according to an embodiment of the present invention.

FIG. 10 is a flowchart for illustrating program data receiving/display processing in the information communication terminal device according to an embodiment of the present invention. This figure shows a flowchart detailing the processing of S804 in FIG. 8.

Figure 11:
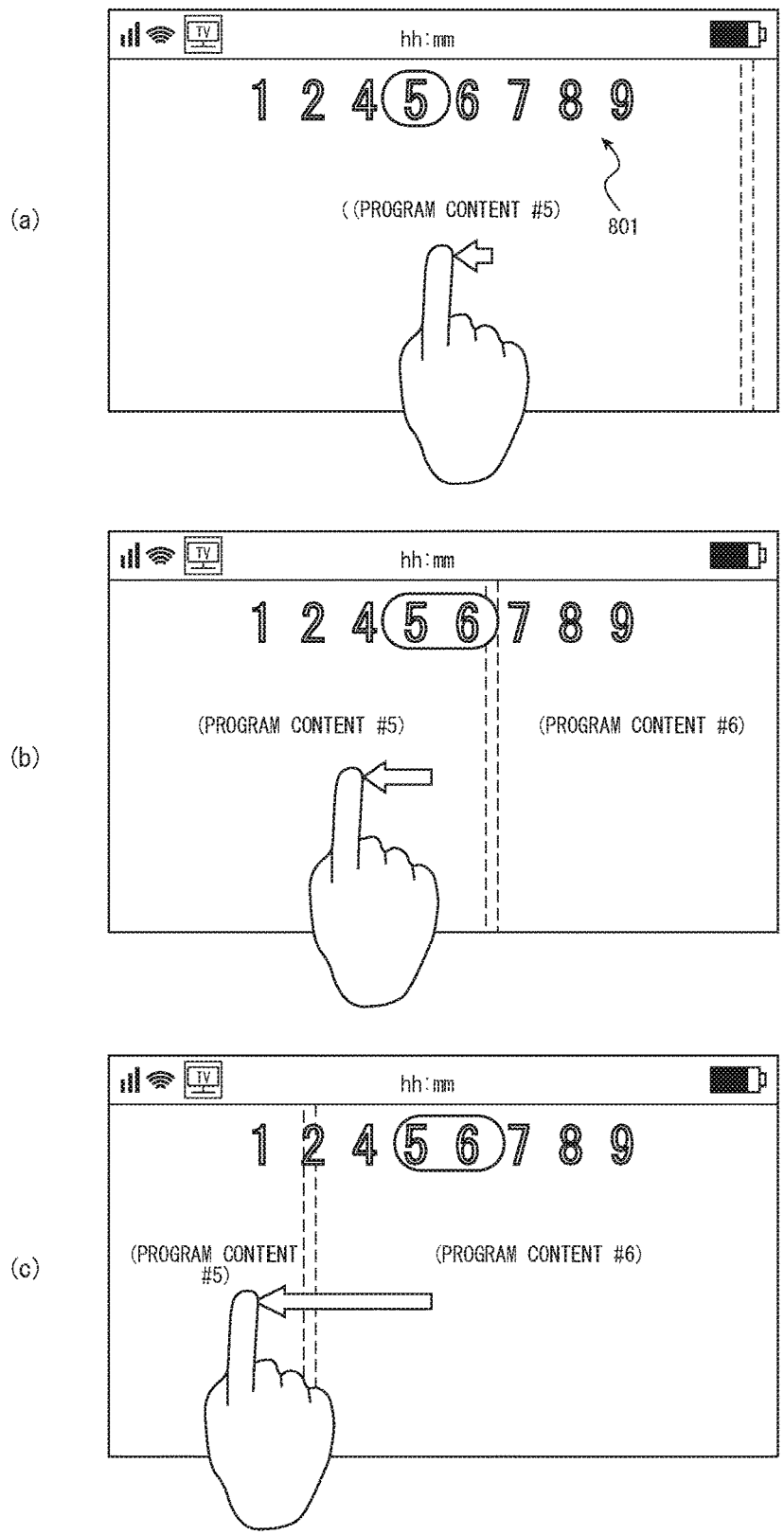
FIG. 11 is a diagram for illustrating an operation performed on an screen displayed on a user interface of an information communication terminal device according to an embodiment of the present invention.

As shown in FIG. 10, the program viewing processing unit 4200 identifies a directional vector of the second operation detected by the user interface unit 4400 and determines whether the identified directional vector is either in the direction or the top-bottom direction (S1001). For example, the program viewing processing unit 4200 identifies the directional vector based on the start point and trajectory point over time of the second operation, and determines whether the identified directional vector represents the right-left direction or the top-bottom direction. If the directional vector of the second operation is determined to represent the right-left direction, the program viewing processing unit 4200 identifies the channel number corresponding to the start point of the directional vector (S1002A). For example, if the user swipes from right to left on the screen of the touch panel 461 as shown in FIG. 11, the program viewing processing unit 4200 increments the current channel number in the EPG information to set it to channel number "6." Alternatively, if the user swipes from left to right on the screen (not shown), the program viewing processing unit 4200 decrements the channel number to set it to channel number "4." At this time, the channel number icon display may be gradually switched in conformity with the switching of the program content displayed on the screen. It should be noted that even if the user does not release the finger performing the swiping from the screen, when the direction of movement is changed, the program viewing processing unit 4200 may still recognize this as a new program switching operation.

Figure 12:
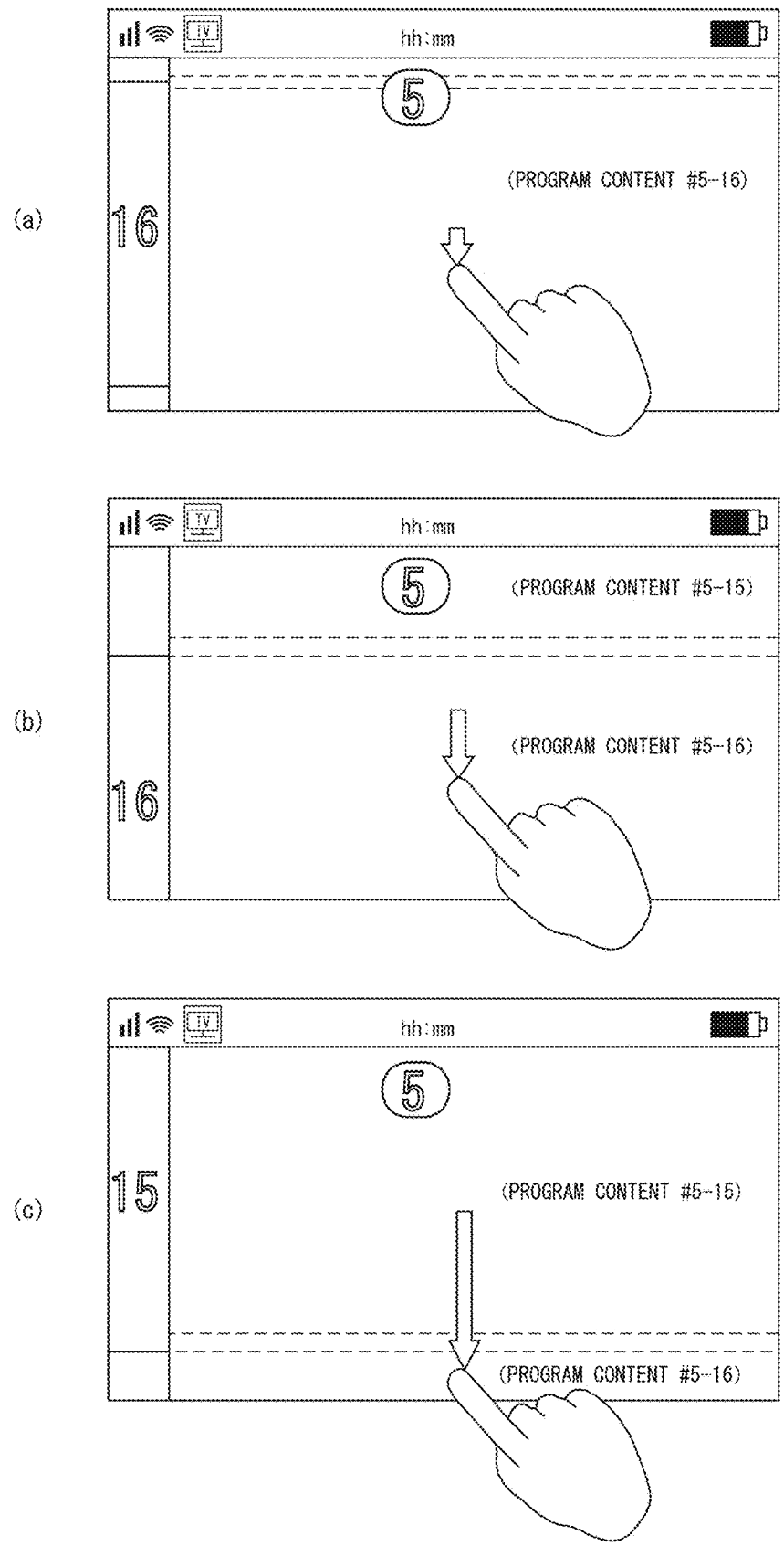
FIG. 12 is a diagram for illustrating an operation performed on the screen displayed on a user interface of an information communication terminal device according to an embodiment of the present invention.

On the other hand, if the identified directional vector is determined to represent the top-bottom direction, the program viewing processing unit 4200 identifies the delivery time slot corresponding to the start point of the directional vector (S1002B). For example, if the user swipes from top to bottom on the screen of the touch panel 461 as shown in FIG. 12, the program viewing processing unit 4200 decrements the delivery time slot in the EPG information (i.e., shifts in the direction toward the past). Alternatively, if the user swipes from bottom to top on the screen (not shown), the program viewing processing unit 4200 increments the delivery time slot (i.e., shifts in the direction toward the future). At this time, similarly to the channel number, the icon indication of the delivery time slot may be gradually switched in conformity with the switching of the program content displayed on the screen.

Subsequently, the program viewing processing unit 4200 acquires the URL associated with the channel number of the identified program according to the channel allocation information (S1003), and then acquires the program identification code of the program according to the EPG (S1004).

The program viewing processing unit 4200 then sends a request for delivery of program data via the communication interface unit 4500 based on the acquired URL and the program identification code (S1005). In response to this, the delivery server of the delivery provider system 30, which is identified by the URL, starts streaming program data of the program corresponding to the program identification code to the information communication terminal device 40, and the program viewing processing unit 4200 receives the streamed program data and display the program content on the screen based on the received program data (S1006).

In receiving and displaying the program data, the program viewing processing unit 4200 performs control such that the screen display switching (transition) from the current (prior-to-switching) program content to the program content of the switching destination is displayed in a smooth or continuous manner. For example, the program viewing processing unit 4200 receives the program data of the program of the switching destination in parallel with the program data of the currently viewed program, and displays each program content of the received program data on the screen. In this case, the program viewing processing unit 4200 stops receiving the program data of the current program content when, for example, the screen display of the program content is completely switched.

For example, the program viewing processing unit 4200 performs control such that: first program content is displayed in a first display area in the screen based on first program data received according to the currently selected channel number and delivery time slot; and that second program content is displayed in a second display area in the screen based on second program data, which the program viewing processing unit 4200 has started to receive according to the channel number and delivery time slot of the switching destination. At this time, the program viewing processing unit 4200 may perform control such that the second program content is gradually displayed on the screen subjectively by, for example, varying the size ratio of the second display area with respect to the first display area in conformity with the movement of the second operation (i.e., the movement of the finger) by the user. For example, for a swipe operation from right to left, as shown in FIGS. 11(a) to (c), the program viewing processing unit 4200 performs control such that the screen is scrolled by 'sliding in' the program content of the switching destination, from the right edge of the screen, such content being connected to the currently displayed program content, in conformity with the movement of the second operation by the user. Alternatively, for a swipe operation from top to bottom, as shown in FIGS. 12(a) to (c), the program viewing processing unit 4200 performs control such that the screen is scrolled by "sliding in" the program content of the switching destination, from the top edge of the screen, such content being connected to the currently displayed program content, in conformity with the movement of the second operation by the user.

The program viewing processing unit 4200 then stops requesting and receiving the delivery of program data of the prior-to-switching program as the user completes the second operation. By this, the viewing processing unit 4200 displays the program content based on the program data of the currently selected program on the screen until a new program switching operation is occurred.

According to the present embodiments as described above, the information communication terminal device 40 may identify, upon receipt of a swipe operation by the user who is viewing a program, a program of the switching destination based on the direction of the swipe operation and may send a request to the delivery provider system 30 to deliver the program data of the identified program of the switching destination. Among others, the information communication terminal device 40 may select a program on a different channel number in the same delivery time slot by swiping in a first direction (e.g., horizontally) on the screen, and the information communication terminal device 40 may select a program in a different delivery time slot on the same channel by swiping in a second direction (e.g., vertically) orthogonal to the first direction. Accordingly, the user is allowed to switch the currently viewed program by means of intuitive operations.

In addition, according to the present embodiments, the program data of the program of the switching destination is received in parallel with the program data of the current program, and therefore, the screen display from the currently viewed program to the program of the switching destination may be transitioned in conformity with the swipe operation by the user.

Variation Example(s)

In the above-described embodiments, the user's operation is described on the assumption that the input operation is performed by one finger, but this is not a limitation. The user's operation may be, for example, a multi-input operation performed by two or more fingers. For example, if the first operation by the user detected by the user interface unit 4400 is a multi-touch operation performed on the screen by two fingers, the program selection unit 4230 may select a program by skipping one or more programs. More specifically, if the user's input operation is an operation in the horizontal direction (the first direction) by multiple taps, the program selection unit 4230 performs switching by skipping channels. If the user's input operation is an operation in the top-bottom direction (the second direction) by multiple taps, the program selection unit 4230 performs switching by skipping program delivery time slots. This allows the user to quickly reach the desired channel and/or program. The number of channel/program skips is not limited to one, and it may be determined depending on the speed of finger movement. The program data acquisition unit 4240 requests delivery of program data according to link information and a program identification code associated with the program of the switching destination selected by the program selection unit 4230, and in response to such request, starts receiving such program data delivered from such specific delivery server.

The above-described respective embodiments are illustrations for describing the present invention, and are not intended to limit the present invention only to these embodiments. The present invention may be implemented in various forms, as long as they do not deviate from the gist of the invention.

For example, the steps, actions, or functions in the method disclosed in the present specification may be implemented in parallel or in different order, unless there is no inconsistency in the results. The described steps, actions, and functions are provided as examples only and some of the steps, actions, and functions may be omitted and may be performed as one entity by being combining with each other, and other steps, actions, or functions may be added, to the extent that they do not deviate from the gist of the invention.

In addition, various embodiments are disclosed in the present specification, but specific features (technical matters) in one embodiment may be added to other embodiments with appropriate improvements, or may be replaced with specific features in such other embodiments, and such embodiments are also included in the gist of the present invention.

REFERENCES

1 . . . IPTV service system 1
10 . . . Communication network
   12 . . . IP network
   14 . . . Mobile communication network
   16 . . . Gateway
   18 . . . Dedicated line
20 . . . Broadcaster system
30 . . . Distribution provider system
40 . . . Information communication terminal device
   41 . . . Processor module
   42 . . . Chipset
   43 . . . Memory module
   44 . . . I/O controller
   45 . . . Peripheral interface
      451 . . . I/O interface
      452 . . . Communication interface
   46 . . . I/O devices
      461 . . . Touch panel
      462 . . . Speaker
   47 . . . GPS module
   4100 . . . Storage unit
   4200 . . . Program viewing processing unit
      4210 . . . Region settings unit
      4220 . . . Channel allocation identification unit
      4230 . . . Program selection unit
      4240 . . . Program data acquisition unit
      4250 . . . Decoding unit
   4300 . . . I/O control unit
      4310 . . . Input control unit
      4320 . . . Output control unit
   4400 . . . User interface unit
   4500 . . . Communication interface unit

The invention claimed is:

1. An information communication terminal device adapted for an IPTV service which delivers program data from one of a plurality of delivery servers via a communication network, comprising: a program selection unit which selects a program according to EPG information in which program scheduling is defined by a plurality of channels and a plurality of delivery time slots along a time axis, the program being selected based on the channels and the delivery time slots; a program data acquisition unit which requests delivery of program data of the program to a specific delivery server according to link information and a program identification code, both of which are associated with the selected program, and acquires the program data delivered from the specific delivery server in response to the request; and a display control unit which performs control such that program content is displayed on a touch panel based on the received program data, wherein, without displaying the EPG, the program selection unit:

determines a first touch operation performed by a user on the touch panel while a program content is displayed on a screen of the touch panel without displaying the EPG, determines a second touch operation performed by the user on the touch panel within a predetermined time period following the first touch operation, the second touch operation involving movement in a predetermined direction, identifies, the predetermined direction of the second touch operation, selects, if the predetermined direction of the second touch operation represents a first direction, the program by identifying a channel of a switching destination in the same delivery time slot in the EPG information, the same delivery time slot corresponding to the first direction, and selects, if the predetermined direction of the second touch operation represents a second direction orthogonal to the first direction, the program by identifying a delivery time slot of a switching destination on the same channel in the EPG information, the same channel corresponding to the second direction, and wherein, in response to the first touch operation, superimposes the delivery time slot icon and the channel icon on the first program content displayed on the screen, the delivery time slot icon being located at one end portion of the screen and the channel icon being located at another end portion orthogonal to the one end portion of the screen, and determines the second touch operation within the predetermined time period following the first touch operation which causes the delivery time slot icon and the channel icon to be displayed.

2. The information communication terminal device according to claim 1, wherein the user's touch operation is at least one of a swipe operation, a flick operation, or a scroll operation, with respect to the touch panel.

3. The information communication terminal device according to claim 1, wherein the display control unit performs control such that switching from a first program content to a second program content is displayed on the touch panel in a smooth manner, in response to movement in the touch operation.

4. The information communication terminal device according to claim 3, wherein the display control unit performs the switching from the first program content to the second program content on the touch panel by scrolling in a predetermined direction.

5. A method for controlling display in an information communication terminal device adapted for an IPTV service which delivers program data from one of a plurality of delivery servers via a communication network, the method comprising: acquiring EPG information in which program scheduling is defined by a plurality of channels and a plurality of delivery time slots along a time axis; selecting a program according to the acquired EPG information; requesting delivery of program data of the program to a specific delivery server according to link information and a program identification code associated with the selected program; in response to the request, acquiring the program data delivered from the specific delivery server; and performing control such that program content is displayed on a touch panel based on the acquired program data, wherein selecting the program without displaying the EPG, comprises:

determining a first touch operation performed by the user on the touch panel while a program content is displayed on a screen of the touch panel without displaying the EPG, determining a second touch operation performed by the user on the touch panel within a predetermined time period following the first operation, the second touch operation involving movement in a predetermined direction, identifying, the predetermined direction of the second touch operation;

selecting, if the predetermined direction of the second touch operation represents a first direction, the program, without displaying the EPG, by identifying a channel of a switching destination in the same delivery time slot in the EPG information, the same delivery time slot corresponding to the first direction; and selecting, if the predetermined direction of the second touch operation represents a second direction orthogonal to the first direction, the program, without displaying the EPG, by identifying a delivery time slot of a switching destination on the same channel in the EPG information, the same channel corresponding to the second direction;

wherein, in response to the first touch operation, superimposing the delivery time slot icon and the channel icon on the first program content displayed on the screen, the delivery time slot icon being located at one end portion of the screen and the channel icon being located at another end portion orthogonal to the one end portion of the screen, and determining the second touch operation within the predetermined time period following the first touch operation which causes the delivery time slot icon and the channel icon to be displayed.

6. A product comprising a non-transitory computer-readable medium storing a computer program for achieving a method for displaying program content based on program data delivered by one of a plurality of delivery servers via a communication network, wherein the computer program causes, by execution under control of a computing device, the computing device to perform to: acquire EPG information in which program scheduling is defined by a plurality of channels and a plurality of delivery time slots along a time axis; select a program according to the acquired EPG information; request delivery of program data of the program to a specific delivery server according to link information and a program identification code associated with the selected program; in response to the request, acquire the program data delivered from the specific delivery server; and perform control such that program content is displayed on a touch panel based on the acquired program data, wherein selecting the program without displaying the EPG comprises: determining a first touch operation performed by the user on the touch panel while a program content is displayed on a screen of the touch panel without displaying the EPG, determining a second touch operation performed by the user on the touch panel within a predetermined time period following the first touch operation, the second touch operation involving movement in a predetermined direction, identifying, the predetermined direction of the second touch operation; selecting, if the predetermined direction of the second touch operation represents a first direction, the program, by identifying a channel of a switching destination in the same delivery time slot in the EPG information, the same delivery time slot corresponding to the first direction; and selecting, if the predetermined direction of the second touch operation represents a second direction orthogonal to the first direction, the program by identifying a delivery time slot of a switching destination on the same channel in the EPG information, the same channel corresponding to the second direction;

wherein, in response to the first touch operation, superimposing the delivery time slot icon and the channel icon on the first program content displayed on the screen, the delivery time slot icon being located at one end portion of the screen and the channel icon being located at another end portion orthogonal to the one end portion of the screen, and determining the second touch operation within the predetermined time period following the first touch operation which causes the delivery time slot icon and the channel icon to be displayed.

* * * * *